US009394012B2

(12) United States Patent
Reuvekamp et al.

(10) Patent No.: US 9,394,012 B2
(45) Date of Patent: Jul. 19, 2016

(54) VEHICLE FRONT SPOILER

(71) Applicant: Apollo Tyres Global R&D B.V., Enschede (NL)

(72) Inventors: Louis-Philippe Antoine Eugene Maria Reuvekamp, Enschede (NL); Gerard Nijman, Losser (NL)

(73) Assignee: Apollo Tyres Global R&D B.V., Enschede (NL)

( * ) Notice: Subject to any disclaimer, the term of this patent is extended or adjusted under 35 U.S.C. 154(b) by 0 days.

(21) Appl. No.: 14/542,942

(22) Filed: Nov. 17, 2014

(65) Prior Publication Data

US 2015/0175222 A1 Jun. 25, 2015

(30) Foreign Application Priority Data

Dec. 20, 2013 (NL) .................................... 2012011

(51) Int. Cl.
*B60J 9/00* (2006.01)
*B62D 35/00* (2006.01)

(52) U.S. Cl.
CPC .................................. *B62D 35/005* (2013.01)

(58) Field of Classification Search
CPC .... B62D 35/005; B62D 35/007; B62D 35/02; B62D 37/02; B60R 21/34; H01L 2924/00; B60J 5/101
USPC ............... 296/180.1, 180.3, 180.5, 180.2, 91; 180/903; 293/117
See application file for complete search history.

(56) References Cited

U.S. PATENT DOCUMENTS

| 4,131,308 A * | 12/1978 | Holka ................. | B62D 35/005 296/180.5 |
| 4,159,140 A * | 6/1979 | Chabot ................ | B62D 35/005 105/1.3 |
| 4,460,213 A * | 7/1984 | Janssen ................ | B62D 35/005 296/180.5 |
| 5,692,796 A * | 12/1997 | Yamamoto ........... | B62D 35/005 180/903 |
| 6,170,904 B1 * | 1/2001 | Schaedlich .......... | B62D 35/007 180/903 |
| 6,196,620 B1 * | 3/2001 | Haraway, Jr. ........ | B62D 35/007 180/903 |
| 6,513,843 B1 * | 2/2003 | Frederick ................ | B60R 19/18 293/120 |
| 7,055,891 B2 * | 6/2006 | Jungert ................ | B62D 35/005 296/180.5 |
| 8,470,121 B2 * | 6/2013 | Reuvekamp .................. | 152/450 |
| 2003/0116996 A1 * | 6/2003 | Soja ..................... | B62D 35/005 296/180.5 |
| 2010/0032068 A1 * | 2/2010 | Reuvekamp ............ | B32B 25/02 152/450 |
| 2010/0052362 A1 * | 3/2010 | Reuvekamp ............ | B29C 65/02 296/180.1 |

(Continued)

OTHER PUBLICATIONS

Search Report and Written Opinion for corresponding Dutch Application No. NL 2012011, dated Aug. 19, 2014.

*Primary Examiner* — Kiran B Patel
(74) *Attorney, Agent, or Firm* — Renner, Otto, Boisselle & Sklar, LLP

(57) ABSTRACT

A vehicle front spoiler comprises a flexible airflow guiding element provided in a region of a front part of the vehicle and extending in a transverse direction Y of the vehicle, and an actuating member, configured to move the airflow guiding element relative to said part of the vehicle between an extended operative position and a retracted inoperative position in which the airflow guiding element is folded rearwards to behind said vehicle part. The airflow guiding element is made of a rubber composition comprising an anisotropic textile structure of reinforcement cord having an elongation at break in the Y-direction of from 5% to 50%, and an elongation at break in the Z-direction lower than the elongation at break in the Y-direction, and is readily moved between the operative and the inoperative position with relatively low hysteresis losses.

15 Claims, 4 Drawing Sheets

(56) References Cited

U.S. PATENT DOCUMENTS

| | | | |
|---|---|---|---|
| 2013/0049399 A1* | 2/2013 | Hoelzel | B62D 35/005 296/180.5 |
| 2013/0057022 A1* | 3/2013 | Hoelzel | B62D 35/005 296/180.5 |
| 2014/0110970 A1* | 4/2014 | Hoelzel | B62D 35/005 296/180.5 |
| 2014/0175831 A1* | 6/2014 | Hoelzel | B62D 35/005 296/180.5 |
| 2015/0239511 A1* | 8/2015 | Reuvekamp | B62D 35/005 296/180.1 |

* cited by examiner

VEHICLE FRONT SPOILER

This application claims priority to Application No. NL 2012011, filed Dec. 20, 2013.

FIELD OF THE INVENTION

The present invention relates to a vehicle front spoiler, comprising a flexible airflow guiding element and an actuating member, configured to move the airflow guiding element. The invention further relates to a flexible airflow guiding element for use in a vehicle front spoiler.

BACKGROUND OF THE INVENTION

A flexible spoiler for a motor vehicle having a movable airflow guiding element is for instance disclosed in U.S. Pat. No. 7,055,891. The disclosed vehicle spoiler comprises an adapter plate to which one edge of an airflow guiding element is connected. The airflow guiding element can be deployed and moved back to its basic position around the connection with the adapted plate by an actuating member between a retracted inoperative position in which the airflow guiding element lies against the adapter plate, and an extended operative position in which the airflow-conducting element is deployed to form an extension of the bumper of the vehicle.

It is important to be able to swiftly bring the airflow-guiding element from the folded-out operative position to the folded-in retracted position, and to keep it in this position for the intended time. Alternatively, it is also important to be able to swiftly bring the airflow-guiding element from the folded-in inoperative position to the folded-out operative position. Such movements of the airflow guiding element need to be carried out an extensive number of times over the lifetime of the spoiler, and are preferably substantially reversible. Any hysteresis losses should be avoided or limited at least, also at low temperatures.

The present invention has for its object to provide an improved vehicle front spoiler. In particular, it is an object of the present invention to provide a vehicle spoiler having a flexible airflow guiding element that is swiftly movable a relatively large number of times whereby the movements are substantially reversible and exhibit relatively low hysteresis losses.

SUMMARY OF THE INVENTION

This and other goals are achieved by providing a vehicle front spoiler in accordance with appended claim 1. The vehicle front spoiler in accordance with the invention in particular comprises a flexible airflow guiding element provided in a region of a front part of the vehicle and extending in a transverse direction Y of the vehicle over at least a part of a width of said front part, and an actuating member, configured to move the airflow guiding element relative to said part of the vehicle between an extended operative position in which the airflow guiding element forms an extension of said vehicle part in a direction Z, and a retracted inoperative position in which the airflow guiding element is folded rearwards to behind said vehicle part, the airflow guiding element being made of a rubber composition comprising an anisotropic textile structure of reinforcement cord having an elongation at break in the Y-direction of from 5% to 50%, and an elongation at break in the Z-direction which is lower than the elongation at break in the Y-direction.

The airflow guiding element of the spoiler is readily moved between the operative and inoperative position thereof by folding it rearwards to behind the vehicle part, yet provides sufficient stiffness to adequately perform its function of airflow guiding element.

The dependent claims refer to preferred embodiments of the invention.

In one preferred aspect of the invention, a vehicle front spoiler is provided wherein the elongation at break in the Y-direction ranges from 10% to 45%, more preferably from 15% to 40%, most preferably from 20% to 35%.

In yet another embodiment of the invention, a vehicle front spoiler is provided wherein the elongation at break in the Z-direction is as low as possible. Specific embodiments relate to a vehicle front spoiler wherein the elongation at break in the Z-direction is lower than 10%, more preferably lower than 5%, and most preferably lower than 3%.

Another preferred embodiment of the vehicle front spoiler according to the invention comprises a textile structure of reinforcement cord comprising yarns extending in the Y-direction and in the Z-direction. In a useful embodiment, the yarns that extend in the Y-direction comprise polyamide yarns. Suitable polyamide yarns (such as Nylon 6,6 for instance) have an elongation at break of 21% or more, a stiffness of 12% at a load of between 4,5 and 10 kg, and a strength of 8 to 18 kg for 900 to 2000 dtex yarns respectively.

Yet another preferred embodiment of the vehicle front spoiler according to the invention comprises a textile structure of reinforcement cord wherein the yarns that extend in the Z-direction comprise polyester yarns and/or cellulosic yarns, such as Rayon.

The reinforcement cord used in the textile structure is build up of yarns. As used herein a "yarn" is either a single continuous filament or wire, or multiple continuous filaments or wires that are twisted, intermingled, roved or assembled together. A cord or "cabled strand" as used herein represents a plurality of yarns that may be twisted around each other or wound around a central yarn. The reinforcement cord may be a composite hybrid cord. By "hybrid" is meant that the cord contains at least two different strength materials. By "composite" is meant that the cord contains cabled strands wrapped or wound around a core.

"Filament" as used herein means a relatively flexible, macroscopically homogeneous body having a high ratio of length to width across its cross-sectional area perpendicular to its length. The filament cross section can be any shape, but in preferred embodiments is round or essentially round.

"Yarn" is a generic term for a continuous strand of fibers or filaments. Yarn occurs in the following forms: 1) a number of fibers twisted together; 2) a number of filaments laid together without twist; 3) a number of filaments laid together with a degree of twist; 4) a single filament with or without twist (monofilament); 5) a narrow strip of material with or without twist.

If applicable, "dtex" is understood to mean the weight in grams of 10,000 meters of a yarn before the yarn has a twist imparted thereto.

An air guiding element that shows further reduced hysteresis losses when moved between the operative and inoperative position is provided by an embodiment in which the Y-direction and Z-direction yarns in the textile structure of reinforcement cord cross at intersections and the intersections are fixated. Fixation of the cross-over intersections can be accomplished by any means known in the art, such as by applying chemical and/or physical bonding means, and/or by applying mechanical means. Particularly suitable mechanical means comprise filaments, fibers or yarns that form loops around the intersections and/or interconnect or form a bridge between Y-direction and Z-direction yarns at the intersections. A textile structure of reinforcement cords having mechanically fixated intersections can be provided by any means in the art, such as by weaving and/or knitting. A preferred embodiment in this respect however is offered by a vehicle front spoiler wherein the textile structure of reinforcement cord comprises a knitted structure. A knitted structure having mechanically fixated intersections of Y-direction and Z-direction yarns is particularly preferred since a vehicle front spoiler comprising such structure provides a particularly low level of hysteresis losses, particularly at low temperatures, such as temperatures below 0° C., more preferably below −20° C., and most preferably below −40° C.

The aerial weight of the textile structure to be used in the invention can be varied within broad limits. A sufficient amount of reinforcement cords and yarns should be present in order to be able to provide adequate stiffness and strength to the flexible front spoiler. An embodiment of the invention relates to a vehicle front spoiler wherein the textile structure of reinforcement cord has an aerial weight of from 100 g/m2 to 300 g/m2, more preferably of from 150 g/m2 to 250 g/m2, and most preferably of from 170 g/m2 to 220 g/m2.

In order to improve handleability of the textile structure a preferred embodiment of the a vehicle front spoiler according to the invention comprises a textile structure of reinforcement cord having an end count according to DIN 53853 of from 35 to 65 ends/dm in the Y-direction, and of from 15 to 30 ends/dm in the Z-direction.

Another embodiment of the vehicle front spoiler according to the invention is characterized in that the Y-direction and/or the Z-direction yarns in the textile structure of reinforcement cord are helically twisted, whereby an embodiment in which only the Y-direction yarns in the textile structure of reinforcement cord are helically twisted is particularly preferred.

The yarn twist can be varied within a wide range but a vehicle front spoiler wherein the Y-direction and/or the Z-direction yarns have a yarn twist in the range of from 50 to 200 turns per meter is preferred.

The yarns can be twisted in accordance with a Z-twist or an S-twist, whereby a vehicle front spoiler wherein the Y-direction and/or the Z-direction yarns have an S-twist is particularly preferred. In an further improved embodiment, a vehicle front spoiler is provided wherein the Y-direction and/or the Z-direction yarns comprise filaments that are Z-twisted.

The amount of textile structure of reinforcement cords in the flexible airflow guiding element can be large but is generally limited to 1-5, and more preferably to 1-3, whereby a vehicle front spoiler comprising one textile structure of reinforcement cord only is preferred.

The rubber compositions applied in the flexible front spoiler according to the invention can be prepared in a manner known to the skilled person. Any known method of mixing rubbers, fillers and other additives is in principle suitable for this purpose. It is thus possible to mix the rubber, supplemented with additives and/or other polymers if desired, using an internal mixer or Banbury mixer, a single or double-screw extruder apparatus, a blade kneader, a Buss Co-kneader, a roller and the like. Suitable temperatures during mixing are substantially determined by the rheological properties of the relevant rubber.

The rubber in the rubber composition may be selected from those known in the art. In general these rubbers have a glass transition temperature Tg lower than −10° C., although this is not essential. Rubbers suitable for application are for instance chosen from the group of natural rubbers, isoprene rubbers, butadiene rubbers, styrene butadiene copolymer rubbers, acrylonitrile butadiene copolymer rubbers, if desired copolymerized with styrene, butadiene isoprene copolymer rubbers, chloroprene rubbers, butyl and acryl rubbers, and ethylene-propylene copolymers which, if desired, comprise a third copolymerizable diene monomer such as for instance 1,4-hexadiene, dicyclopentadiene, dicyclooctadiene, methylene norbornene, ethylidene norbornene and tetrahydroindene. The rubber polymer applied in the vehicle front spoiler preferably is an ethylene-propylene rubber, more preferably an ethylene-propylene-diene rubber (EPDM). Mixtures of said rubbers are also possible.

Suitable cross-linkers comprise phenol resins in combination with a tin chloride compound as catalyst, and cross-linkers on the basis of sulphur and/or peroxides. Other additives can also be added to the rubber. Examples of usual additives are stabilizers, antioxidants, lubricants, fillers, dyes, pigments, flame retardants, conductive fibers and reinforcing fibers. The rubber polymers can also comprise oil as additive, and/or petroleum plasticizers.

The rubber may also be partly colored. Any dye known to the skilled person may in principle be used, such as organic and/or inorganic dyes, and dyes which are soluble and/or non-soluble in the rubber. Coupling agents suitable for the rubber may also be added and comprise silane compounds for instance. If desired, the rubber may also comprise carbon black particles and/or silica particles, in principle of any known type.

The textile structure(s) of reinforcement cord may be provided in the airflow guiding element in any conceivable manner, but is preferably combined with the rubber composition of the airflow guiding element by stacking layers of the rubber composition with one or more textile structures of reinforcement cords and compression moulding the assembly thus produced. It is customary in the art to first calendar the reinforcement cords with rubber, preferably on a top and bottom surface of the cord. This facilitates handling and provides for better bonding between the cord and a rubber matrix composition. According to one embodiment of the invention, a vehicle front spoiler is provided wherein the rubber composition comprises a textile structure of reinforcement cord that is not calendered with a rubber.

In another aspect of the invention, a vehicle front spoiler is provided wherein a surface of the textile structure of reinforcement cord comprises a tacky low-molecular weight compound, more preferably a planar surface thereof, and most preferably a top and bottom surface of the textile structure of reinforcement cord.

In another aspect of the invention, a flexible airflow guiding element is provided for use in a vehicle front spoiler.

According to the invention, the flexible airflow guiding element is adapted to be provided in a region of a front part of a vehicle and to extend in a transverse direction Y of said vehicle over at least a part of a width of said front part. The element is further adapted to be movable by an actuating member, configured to move the airflow guiding element relative to said part of the vehicle between an extended operative position in which the airflow-conducting element forms an extension of said vehicle part in a direction Z, and a retracted inoperative position in which the airflow guiding element is folded rearwards to behind said vehicle part. The airflow guiding element is made of a rubber composition comprising an anisotropic textile structure of reinforcement cord having an elongation at break in the Y-direction of from 5% to 50%, and an elongation at break in the Z-direction which is lower than the elongation at break in the Y-direction.

Preferred embodiments of the flexible airflow guiding element have been described above in the context of the invented vehicle spoiler.

BRIEF DESCRIPTION OF THE DRAWINGS

The invention will now be described by way of example and with reference to the accompanying drawings in which.

DETAILED DESCRIPTION OF EXAMPLES OF THE PRESENT INVENTION

Figure 1:
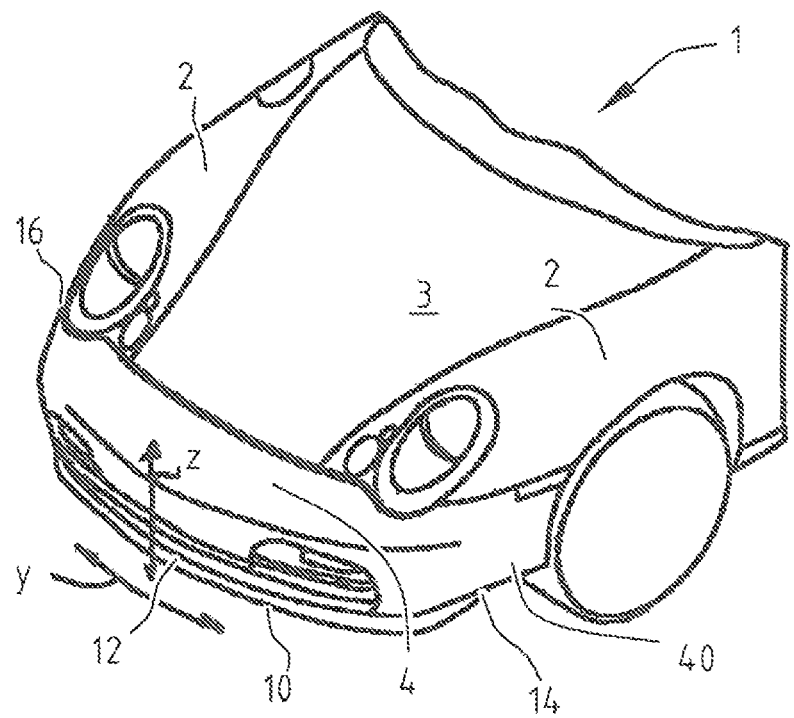
FIG. 1 schematically shows a perspective view of a front part of motor vehicle provided with a flexible front spoiler in accordance with the invention.

With reference to FIG. 1 is shown a front 1 of a motor vehicle comprising side wings 2, a hood 3, arranged in between the side wings 2, and a slightly curved front part 4 provided in front of the hood 3 and forming a bumper. To the front part 4 is attached a flexible front spoiler 10 in accordance with the invention. The front spoiler 10 comprises a flexible airflow guiding element 12, provided in a region of the front part 4 of the vehicle and extending in a transverse direction Y of the vehicle (transverse to the driving direction) over substantially the whole width of said front part 4, i.e. from one free end 14 underneath a left side part 40 of the front part 4 to another free end 16 at the opposite side of the vehicle front part 4.

Figure 2:
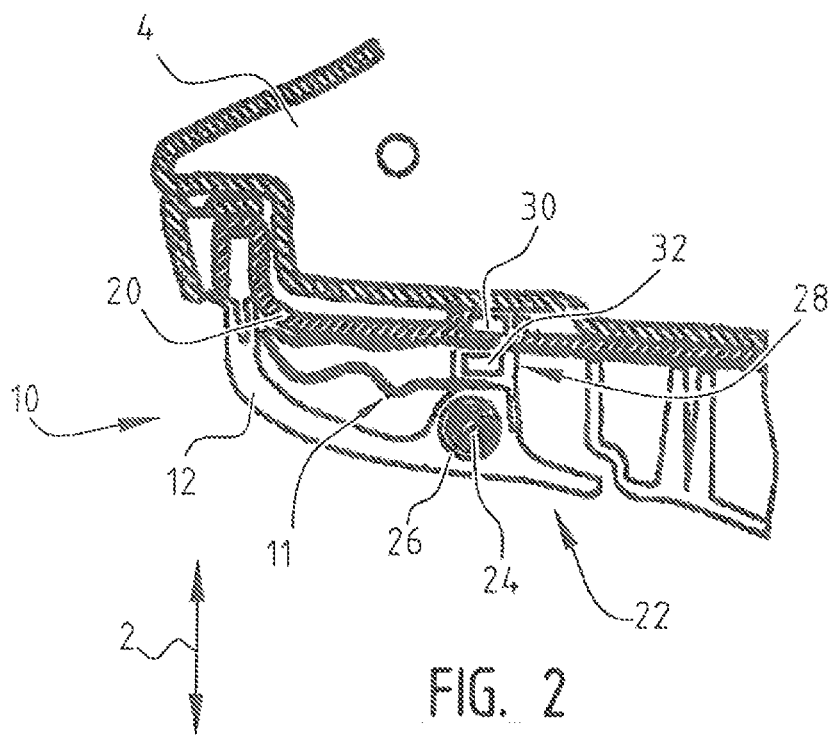
FIG. 2 schematically shows a cross-sectional view of the front part of the motor vehicle provided with a flexible front spoiler of FIG. 1 in a retracted inoperative position.
Figure 3:
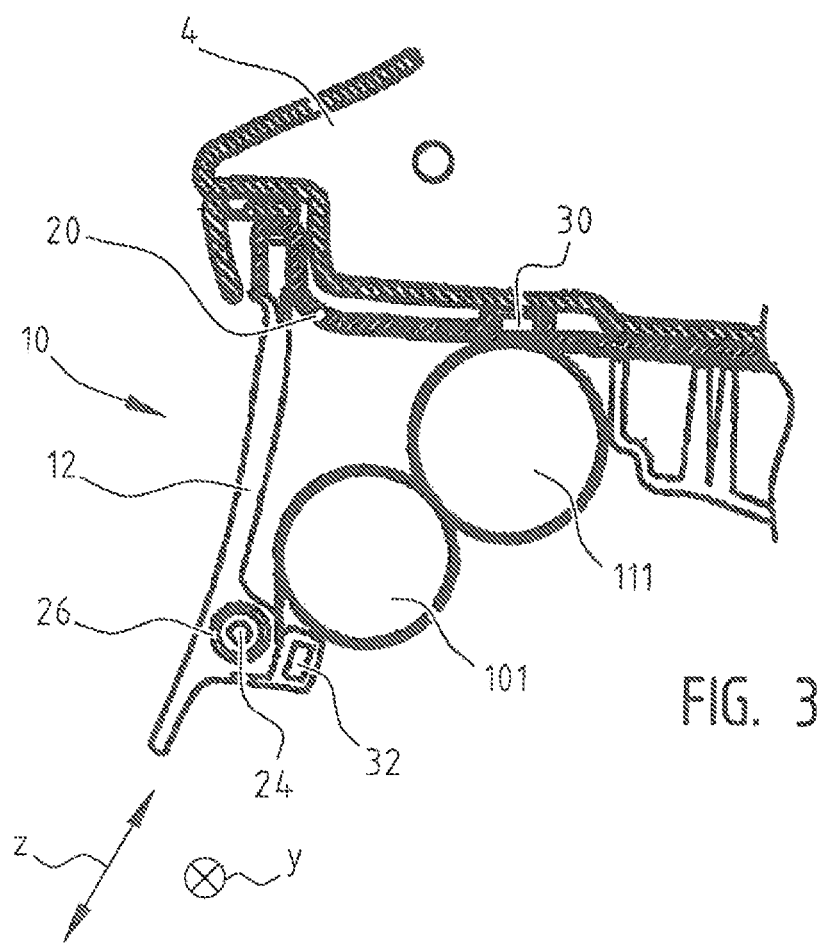
FIG. 3 schematically shows a cross-sectional view of the front part of the motor vehicle provided with a flexible front spoiler of FIG. 1 in an extended operative position.

As shown in more detail in FIGS. 2 and 3, the vehicle front spoiler 10 further comprises an actuating member 11, configured to move the flexible airflow guiding element 12 relative to the front part 4 between a retracted inoperative position, shown in FIG. 2, in which the airflow guiding element 12 is folded rearwards (in the figure to the right) to behind the front part 4 to an extended operative position, shown in FIG. 3, in which the airflow-conducting element 12 forms an extension of vehicle part 4 in a direction Z, which, for is substantially vertical in the embodiment shown. The flexible airflow guiding element 12 can be moved in any position between and including the extreme positions shown in FIGS. 2 and 3.

The airflow guiding element 12 is at one Y-direction edge thereof movably attached to part 4 through an adapter plate 20 that is connected to the underside of the front part 4. The element 12 may at a free edge part 22 thereof be provided with a flexurally elastic rod 24, provided in a cavity 26 that extends through the element 12 in the Y-direction. The rod is preferably made of (fiber reinforced) PTFE or another polymer having a low friction with the surrounding walls of cavity 26.

The airflow guiding element 12 is preferably provided with a closing arrangement 28 that comprises magnets 30 provided in the adapter plate 20, which magnets 30 interact with metal plates 32, arranged in the free edge part 22 of the element 12. As shown in FIG. 2, the magnets 30 and metal plates 32 attract each other in the inoperative position of the element 12 in which the element 12 is folded rearwards to behind vehicle part 4 (as defined with respect to the forward driving direction of the vehicle). This ensures that the airflow guiding element 12 better remains in the folded in state.

The actuating member 11 in the embodiment shown in FIGS. 2 and 3 comprises a number of bellows (101, 111) that can be filled with air or other fluid, and/or from which air or another fluid can be withdrawn to move the airflow guiding element 12 in between the inoperative and operative positions.

In accordance with the invention, the airflow guiding element 12 is made of a rubber composition comprising an anisotropic textile structure of reinforcement cord having an elongation at break in the Y-direction of from 5% to 50%, and an elongation at break in the Z-direction which is lower than the elongation at break in the Y-direction. Since airflow guiding element 12 preferably extends over a substantial part of the width of the vehicle (or alternatively part 4), the airflow guiding element 12 preferably represents an elongated structure with its longer dimension extending in the Y-direction and its shorter dimension extending in the Z-direction. The airflow guiding element 12 is then attached to the front part 4 (or adapted plate 20) with one of its longitudinal edges. The opposite longitudinal edge forms a free edge 22 of the element 12.

Figure 4:
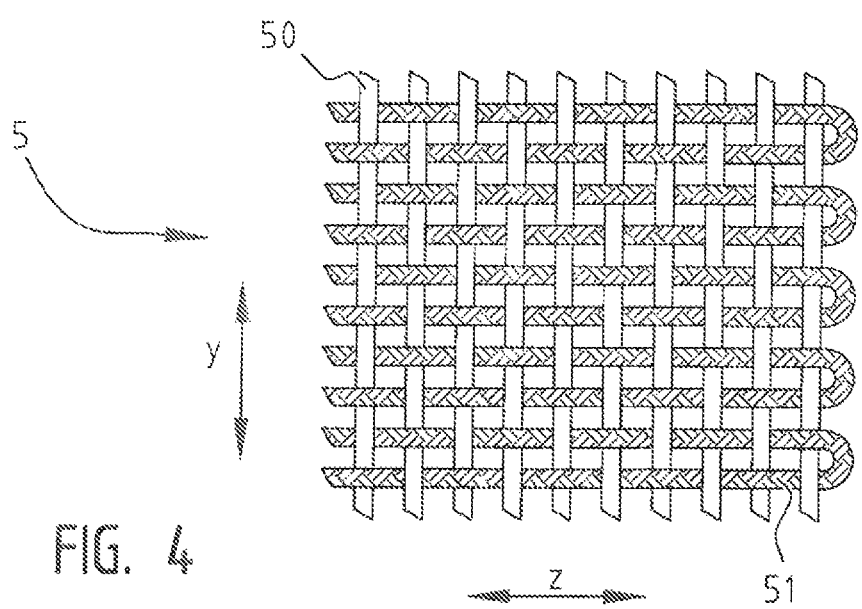
FIG. 4 schematically shows a top view of an anisotropic textile structure of reinforcement cord in accordance with an embodiment of the invention.
Figure 5:
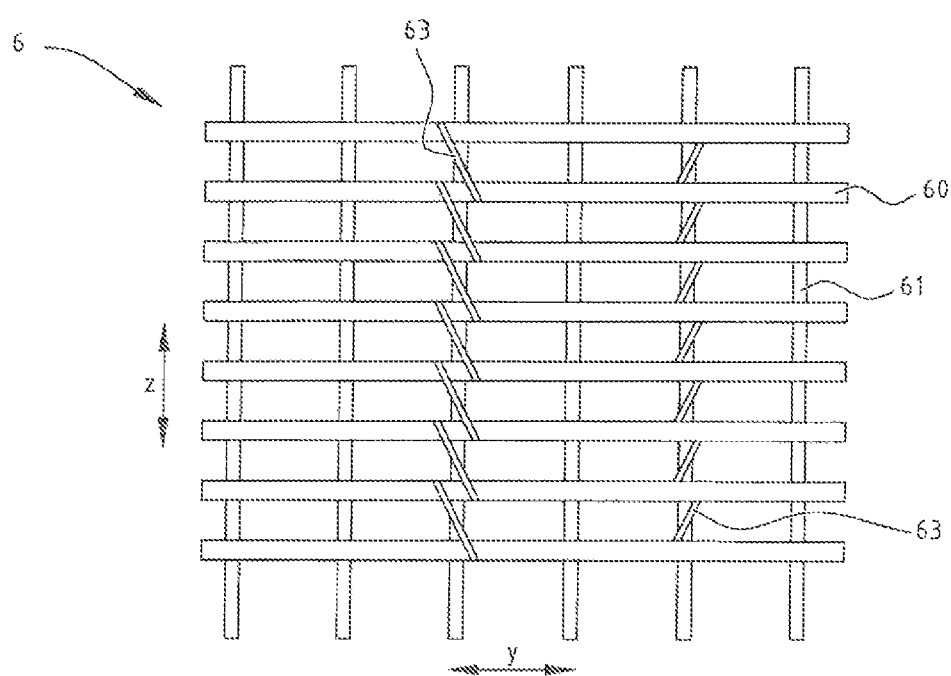
FIG. 5 schematically shows a top view of an anisotropic textile structure of reinforcement cord in accordance with another embodiment of the invention.
Figure 6:
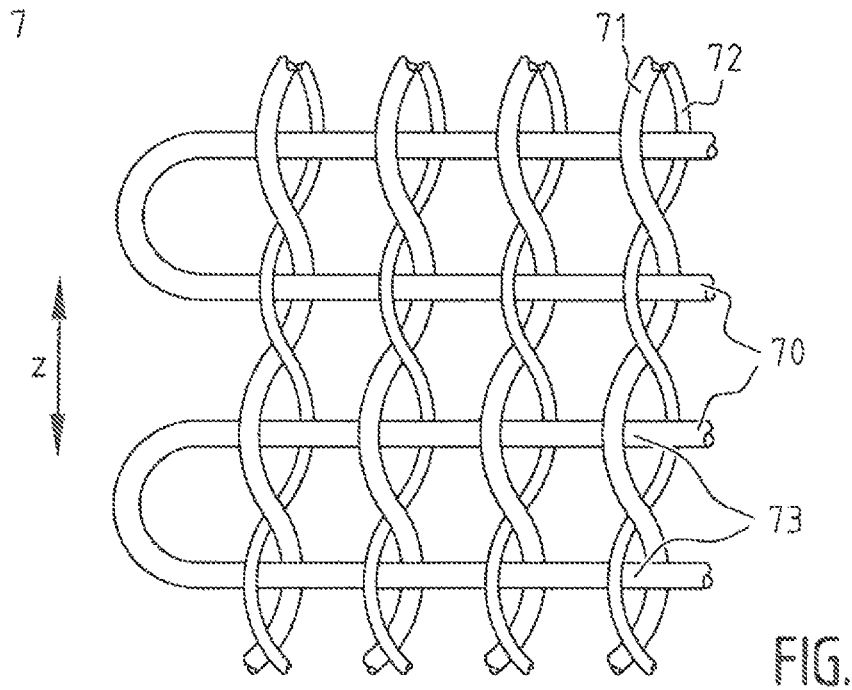
FIG. 6 schematically shows a top view of an anisotropic textile structure of reinforcement cord in accordance with yet another embodiment of the invention.

Suitable anisotropic textile structure of reinforcement cords for use in the flexible airflow guiding element 12 are shown in FIGS. 4 to 6.

FIG. 4 shows part of a suitable textile cord structure 5 comprising warp yarns 50 extending in the Y-direction, and weft yarns extending in the Z-direction. According to the invention, the yarn properties in the structure may be chosen such that the elongation at break in the Y-direction is from 5% to 50%, while the elongation at break in the Z-direction is lower than the elongation at break in the Y-direction.

FIG. 5 shows part of a particularly preferred textile cord structure 6 comprising a knitted structure of yarns 60 extending in the Y-direction, and yarns 61 extending in the Z-direction. According to this embodiment, the Y-direction yarns 60 and Z-direction yarns 61 cross at intersections 62 which are fixated, preferably by textile means in the form of filaments or yarns 63 that connect Y-direction yarns 60 to Z-direction yarns 61 at the cross-over intersections 62. Again, the yarn properties in the structure may be chosen such that the elongation at break in the Y-direction is from 5% to 50%, while the elongation at break in the Z-direction is lower than the elongation at break in the Y-direction.

FIG. 6 shows part of another suitable textile cord structure 7 comprising yarns 70 extending in the Y-direction, and yarns (71, 72) extending in the Z-direction. According to this embodiment, the structure forms a so-called leno weave wherein the intersections 73 are substantially fixated by the two yarns (70, 71). As in other embodiments, the yarn properties in the structure may be chosen such that the elongation at break in the Y-direction is from 5% to 50%, while the elongation at break in the Z-direction is lower than the elongation at break in the Y-direction.

Figure 7:
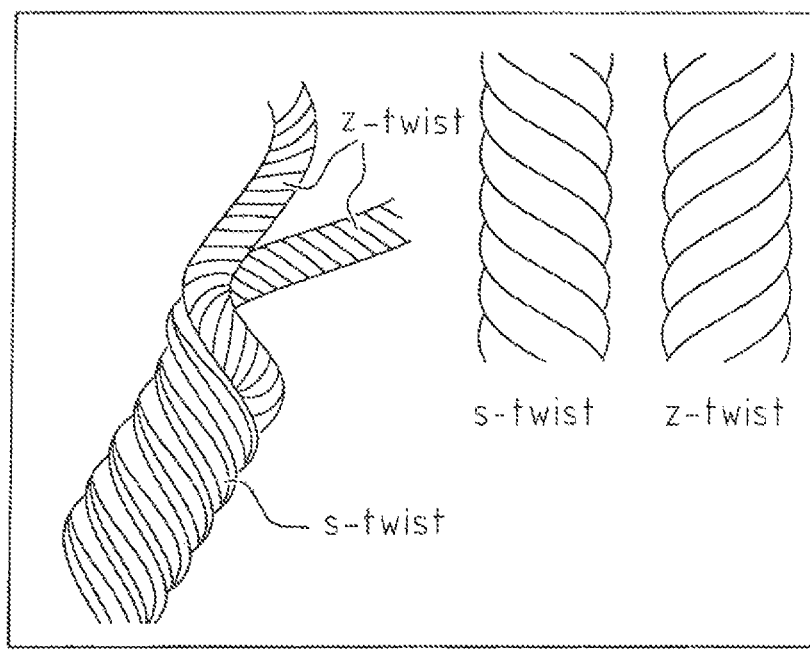
FIG. 7 schematically shows a side view of a construction of a preferred yarn in the textile structure of reinforcement cord in accordance with an embodiment of the invention.

On the left of FIG. 7 are shows preferred embodiments of the yarns, wherein the Y-direction yarns (50, 60, 70) and/or the Z-direction yarns (51, 61, 71, 72), but preferably the Y-direction yarns (50, 60, 70) only, are provided with an S-twist. On the right of FIG. 7 are shown particularly preferred embodiments wherein the Y-direction yarns (50, 60, 70) and/or the Z-direction yarns (51, 61, 71, 72), but preferably the Y-direction yarns (50, 60, 70) only, comprise filaments that are helically twisted according to a Z-twist. The preferred embodiments in particular are instrumental in obtaining a textile structure having a relatively large elongation at break in the Y-direction, as required by claim 1.

The direction of twist refers to the direction of slope of the spirals of a yarn or cord when it is held vertically. If the slope of the spirals conform in direction to the slope of the letter "S", then the twist is called "S", or "left hand". If the slope of the spirals conform in direction to the slope of the letter "Z", then the twist is called "Z", or "right hand". An "S" or "left hand" twist direction is understood to be an opposite direction from a "Z" or "right hand" twist. "Yarn twist" is understood to mean the twist imparted to a yarn before the yarn is incorporated into a cord, and "cord twist" is understood to mean the twist imparted to two or more yarns when they are twisted together with one another to form a cord.

Possible yarn materials may include, but are not limited to polyamide (nylon), aromatic polyamide (aramid), rayon, polyester, polyethylene terephthalate (PET), polyethylene napthalate (PEN), polyvinyl alcohol (PVA), polyethylene ketone (PK), and polyphenylene-2,6-benzobisoxazole (PBO). In the embodiments of the textile structure shown in FIGS. 4 to 6, the Y-direction yarns (50, 60, 61) preferably comprise polyamide (nylon) yarns, whereas the Z-direction yarns (51, 61, 71, 72) preferably comprise polyester yarns.

A particularly preferred embodiment of the airflow guiding element 12 comprises one textile structure of reinforcement cord 6 as shown in FIG. 5 having S-twisted Y-direction nylon yarns 60 and Z-direction polyester yarns 61, an aerial weight ranging between 175 and 220 g/m2, and an end count according to DIN 53853 of about 45 to 55 ends/dm in the Y-direction, and of about 17 to 27 ends/dm in the Z-direction. Such a textile structure 6 has an elongation at break in the Y-direction of about 20 to 25%, while the elongation at break in the Z-direction is about 3 to 7%.

To manufacture the airflow guiding element 12, a layer of the textile structure 12 of reinforcement cord is stacked with several layers of a suitable rubber composition, preferable an EPDM rubber, and the assembly compression moulded at a suitable vulcanisation temperature. The textile structure 12 is preferably applied in an uncalendered state, i.e. without calendaring it with a rubber beforehand. It is also advantageous to provide planar surfaces of the textile structure 12 with a tacky low-molecular weight compound for better adhesion to the rubber composition.

A vehicle spoiler in accordance with the invention comprises a flexible airflow guiding element 12 that is swiftly movable a relatively large number of times between the inoperative position shown in FIG. 2 and the operative position shown in FIG. 3. The airflow guiding element 12 of the invention shows a low level of hysteresis, and the movements therefore remain substantially reversible over the lifetime of the spoiler.

The invention claimed is:

1. Vehicle front spoiler, comprising a flexible airflow guiding element provided in a region of a front part of the vehicle and extending in a transverse direction Y of the vehicle over at least a part of a width of said front part, and an actuating member, configured to move the airflow guiding element relative to said part of the vehicle between an extended operative position in which the airflow-guiding element forms an extension of said vehicle part in a direction Z, and a retracted inoperative position in which the airflow guiding element is folded rearwards to behind said vehicle part, the airflow guiding element being made of a rubber composition comprising an anisotropic textile structure of reinforcement cord having an elongation at break in the Y-direction of from 5% to 50%, and an elongation at break in the Z-direction which is lower than the elongation at break in the Y-direction, wherein the textile structure of reinforcement cord comprises yarns extending in the Y-direction and yarns extending in the Z-direction, and wherein the Y-direction yarns and Z-direction yarns in the textile structure of reinforcement cord cross at intersections and the intersections are fixed.

2. Vehicle front spoiler according to claim 1, wherein the yarns that extend in the Y-direction comprise polyamide yarns.

3. Vehicle front spoiler according to claim 1, wherein the yarns that extend in the Z-direction comprise polyester yarns and/or cellulosic yarns.

4. Vehicle front spoiler according to claim 1, wherein the textile structure of reinforcement cord comprises a knitted structure.

5. Vehicle front spoiler according to claim 4, wherein the knitted structure comprises mechanically fixated intersections of Y-direction and Z-direction yarns.

6. Vehicle front spoiler according to claim 1, wherein the textile structure of reinforcement cord has an aerial weight of from 150 g/m2 to 250 g/m2.

7. Vehicle front spoiler according to claim 1, wherein the textile structure of reinforcement cord has an end count according to DIN 53853 of from 35 to 65 ends/dm in the Y-direction, and of from 15 to 30 ends/dm in the Z-direction.

8. Vehicle front spoiler according to claim 1, wherein the Y-direction and/or the Z-direction yarns in the textile structure of reinforcement cord are helically twisted.

9. Vehicle front spoiler according to claim 8, wherein only the Y-direction yarns in the textile structure of reinforcement cord are helically twisted.

10. Vehicle front spoiler according to claim 8, wherein the Y-direction and/or the Z-direction yarns have a yarn twist in the range of from 50 to 200 turns per meter.

11. Vehicle front spoiler according to claim 8, wherein the Y-direction and/or the Z-direction yarns have an S-twist.

12. Vehicle front spoiler according to claim 1, wherein the Y-direction and/or the Z-direction yarns comprise filaments that are Z-twisted.

13. Vehicle front spoiler according to claim 1, wherein a surface of the textile structure of reinforcement cord comprises a tacky low-molecular weight compound.

14. Vehicle front spoiler according to claim 1, wherein the rubber composition comprises a textile structure of reinforcement cord that is not calendered with a rubber.

15. Flexible airflow guiding element for use in a vehicle front spoiler according to claim 1.

* * * * *